(12) United States Patent
Yoo et al.

(10) Patent No.: US 11,967,714 B2
(45) Date of Patent: *Apr. 23, 2024

(54) POSITIVE ELECTRODE ACTIVE MATERIAL FOR LITHIUM SECONDARY BATTERY AND PREPARATION METHOD THEREOF

(71) Applicant: LG Energy Solution, Ltd., Seoul (KR)

(72) Inventors: Tae Gu Yoo, Daejeon (KR); Younguk Park, Daejeon (KR); Jintae Hwang, Daejeon (KR); Wang Mo Jung, Daejeon (KR); Sungbin Park, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/214,800

(22) Filed: Jun. 27, 2023

(65) Prior Publication Data

US 2023/0352678 A1    Nov. 2, 2023

Related U.S. Application Data

(63) Continuation of application No. 18/100,778, filed on Jan. 24, 2023, which is a continuation of application
(Continued)

(30) Foreign Application Priority Data

Nov. 22, 2017  (KR) ......................... 10-2017-0156745
Nov. 20, 2018  (KR) ......................... 10-2018-0143840

(51) Int. Cl.
*H01M 4/00*  (2006.01)
*C01G 53/00*  (2006.01)
(Continued)

(52) U.S. Cl.
CPC ............ *H01M 4/525* (2013.01); *C01G 53/50* (2013.01); *H01M 4/505* (2013.01);
(Continued)

(58) Field of Classification Search
CPC ...... H01M 4/505; H01M 4/0471; H01M 4/62; H01M 10/0525; H01M 2004/028; H01M 4/366; H01M 204/028
See application file for complete search history.

(56) References Cited

U.S. PATENT DOCUMENTS 9,281,522 B2    3/2016  Vogler et al.
2010/0276217 A1  11/2010  Sugaya et al.
(Continued)

FOREIGN PATENT DOCUMENTS

CN    103700836 A    4/2014
CN    103840151 A    6/2014
(Continued)

OTHER PUBLICATIONS

Lee et al., The Positive Electrode Active Material of Secondary Battery and Secondary Battery Comprising the Same, Oct. 2017, See the Abstract. (Year: 2017).*
(Continued)

*Primary Examiner* — Cynthia H Kelly
*Assistant Examiner* — Monique M Wills
(74) *Attorney, Agent, or Firm* — Lerner David LLP

(57) ABSTRACT

A positive electrode active material in the form of a single particle and a lithium secondary battery containing the positive electrode active material thereof are provided. The positive electrode active material has a nickel-based lithium composite metal oxide single particle. The single particle has a plurality of crystal grains. An average particle size
(Continued)

(D50) of the single particle is from 3.5 µm to 8 µm. The single particle includes a metal doped in the crystal lattice thereof.

10 Claims, 10 Drawing Sheets

Related U.S. Application Data

No. 16/755,688, filed as application No. PCT/KR2018/014367 on Nov. 21, 2018, now Pat. No. 11,594,727.

(51) Int. Cl.
*H01M 4/505* (2010.01)
*H01M 4/525* (2010.01)
*H01M 10/0525* (2010.01)
*H01M 4/02* (2006.01)

(52) U.S. Cl.
CPC ..... *H01M 10/0525* (2013.01); *C01P 2002/52* (2013.01); *C01P 2002/60* (2013.01); *C01P 2004/03* (2013.01); *C01P 2004/04* (2013.01); *C01P 2004/61* (2013.01); *C01P 2006/40* (2013.01); *H01M 2004/028* (2013.01)

(56) References Cited

U.S. PATENT DOCUMENTS

| | | |
|---|---|---|
| 2012/0034516 A1 | 2/2012 | Koo et al. |
| 2012/0070743 A1 | 3/2012 | Kwon et al. |
| 2015/0024273 A1 | 1/2015 | Yamazaki et al. |
| 2015/0037678 A1 | 2/2015 | Kwak et al. |
| 2015/0147655 A1 | 5/2015 | Park et al. |
| 2015/0243978 A1 | 8/2015 | Shon et al. |
| 2016/0322627 A1 | 11/2016 | Yoshida et al. |
| 2016/0372739 A1 | 12/2016 | Song et al. |
| 2017/0222221 A1 | 8/2017 | Park et al. |
| 2017/0271656 A1 | 9/2017 | Lee et al. |
| 2017/0309908 A1 | 10/2017 | Mitsumoto et al. |
| 2019/0115596 A1 | 4/2019 | Kajiyama et al. |

FOREIGN PATENT DOCUMENTS

| | | | |
|---|---|---|---|
| CN | 104733723 A | 6/2015 | |
| CN | 105185982 A | 12/2015 | |
| CN | 107251282 A | 10/2017 | |
| CN | 107251282 A * | 10/2017 | ............ C01G 53/50 |
| EP | 3522272 A1 | 8/2019 | |
| JP | 4440339 B2 | 3/2010 | |
| JP | 2012252964 A | 12/2012 | |
| JP | 2013157109 A | 8/2013 | |
| JP | 2015530721 A | 10/2015 | |
| JP | 2016509567 A | 3/2016 | |
| JP | 2017188428 A | 10/2017 | |
| KR | 20100052419 A | 5/2010 | |
| KR | 20120030774 A | 3/2012 | |
| KR | 101452950 B1 | 10/2014 | |
| KR | 20140135180 A | 11/2014 | |
| KR | 20150047098 A | 5/2015 | |
| KR | 20150099219 A | 8/2015 | |
| KR | 101566155 B1 | 11/2015 | |
| KR | 20160049995 A | 5/2016 | |
| WO | 2016089176 A1 | 6/2016 | |
| WO | 2018160023 A1 | 9/2018 | |

OTHER PUBLICATIONS

International Search Report for Application No. PCT/KR2018/014367 dated Mar. 11, 2019, 2 pages.

Jing Li et al., Comparison of Single Crystal and Polycrystalline LiNi0.5Mn0.3Co0.2O2 Positive Electrode Materials for High Voltage Li-Ion Cells, Journal of the Electrochemical Society, May 2017, pp. A1534-A1544, vol. 164. No. 7, XP055709670, ISSN: 0013-4651, DOI: 10.1149/2.0991707jes.

Extended European Search Report including Written Opinion for Application No. EP18880300.1, dated Oct. 15, 2020, pp. 1-8.

Search Report dated Aug. 2, 2022 from the Office Action for Chinese Application No. 201880064115.3 dated Aug. 12, 2022, pp. 1-2.

Extended European Search Report including Written Opinion for Application No. 23186352.3 dated Nov. 6, 2023, pp. 1-7.

* cited by examiner

POSITIVE ELECTRODE ACTIVE MATERIAL FOR LITHIUM SECONDARY BATTERY AND PREPARATION METHOD THEREOF

CROSS-REFERENCE TO RELATED APPLICATION

The present application is a continuation of U.S. application Ser. No. 18/100,778, filed Jan. 24, 2023, which is a continuation of U.S. application Ser. No. 16/755,688, filed on Apr. 13, 2020, which is a national stage entry under 35 U.S.C. § 371 of PCT/KR2018/014367 filed on Nov. 21, 2018, which claims priority to Korean Patent Application Nos. 10-2017-0156745 and 10-2018-0143840, filed on Nov. 22, 2017 and Nov. 20, 2018, respectively, the disclosures of which are hereby incorporated by reference herein in their entirety.

TECHNICAL FIELD

The present invention relates to a positive electrode active material for a lithium secondary battery having improved lifetime characteristics at a high voltage, and a preparation method thereof.

BACKGROUND ART

With increasing technology development and demands for mobile devices, demand for secondary batteries as an energy source has rapidly increased. Among such secondary batteries, lithium secondary batteries having high energy density and voltage, a long cycle life, and a low self-discharge rate have been commercialized and widely used.

Due to a recent price jump of cobalt (Co), many attempts have been made to increase price competitiveness by substituting inexpensive lithium nickel cobalt manganese oxide (NCM) for lithium cobalt oxide (LCO) which is currently used as a positive electrode active material for small batteries.

In the case of NCM, an upper voltage limit in commercial cells is 4.2 V. When NCM with an upper voltage limit of 4.35 V is used in a small device, there is a problem in that it has inferior performance, as compared to LCO. This is because Li deintercalation of NCM is higher than that of LCO at the same upper voltage limit, and NCM becomes more unstable in a high state of charge (SOC). As a result, rapid deterioration of the lifetime characteristic occurs when NCM is used at a high voltage of 4.35 V or more.

Accordingly, it is necessary to develop NCM positive electrode active materials having improved lifetime characteristics as an inexpensive positive electrode active material that is operable at a high voltage.

DISCLOSURE

Technical Problem

To solve the above problem, an object of the present invention is to provide a positive electrode active material for a lithium secondary battery having an improved lifetime characteristic at a high voltage, and a preparation method thereof.

Technical Solution

An embodiment of the present invention provides a nickel-based lithium composite metal oxide single particle including a plurality of crystal grains.

Specifically, the single particle may include a metal (one or more metals selected from the group consisting of M=Al, Ti, Mg, Zr, W, Y, Sr, Co, F, Si, Na, Cu, Fe, Ca, S, and B) doped in a crystal lattice of the single particle; or a metal (one or more metals selected from the group consisting of M'=Al, Ti, Mg, Zr, W, Y, Sr, Co, F, Si, Na, Cu, Fe, Ca, S, and B) compound coated on the surface of the single particle, together with the metal (one or more metals selected from the group consisting of M=Al, Ti, Mg, Zr, W, Y, Sr, Co, F, Si, Na, Cu, Fe, Ca, S, and B) doped in the crystal lattice of the single particle, wherein a total weight of the metal doped or the metal in the surface-coated metal compound is 2500 to 6000 ppm, and each of the crystal grains included in the single particle has a size of 180 nm to 300 nm, as measured by Cu Kα X ray (X-rα).

Another embodiment of the present invention provides a method of preparing a positive electrode active material for a lithium secondary battery, the method including the steps of: preparing a first mixture including a nickel-based lithium composite metal hydroxide particle having D50 of 8 μm or less, a lithium raw material, and a metal (one or more metals selected from the group consisting of M=Al, Ti, Mg, Zr, W, Y, Sr, Co, F, Si, Na, Cu, Fe, Ca, S, and B) compound, wherein a content of the metal (M) compound in the total weight is 2500 ppm to 6000 ppm; and calcining the first mixture at a temperature of 960° C. or higher.

The method may further include the steps of: preparing a second mixture including the calcined product of the first mixture, and a metal (one or more metals selected from the group consisting of M'=Al, Ti, Mg, Zr, W, Y, Sr, Co, F, Si, Na, Cu, Fe, Ca, S, and B) compound; and calcining the second mixture at a temperature of 350° C. to 800° C., after the step of calcining the first mixture at a temperature of 960° C. or higher.

In this regard, the coating element M' and the doping element M may be the same as or different from each other.

Still another embodiment of the present invention provides a positive electrode for a lithium secondary battery, the positive electrode including the above-described positive electrode active material, and a lithium secondary battery including the positive electrode.

Effect of the Invention

A positive electrode active material for a lithium secondary battery according to the present invention may improve the lifetime characteristic at a high voltage.

BEST MODE FOR CARRYING OUT THE INVENTION

Figure 1A:
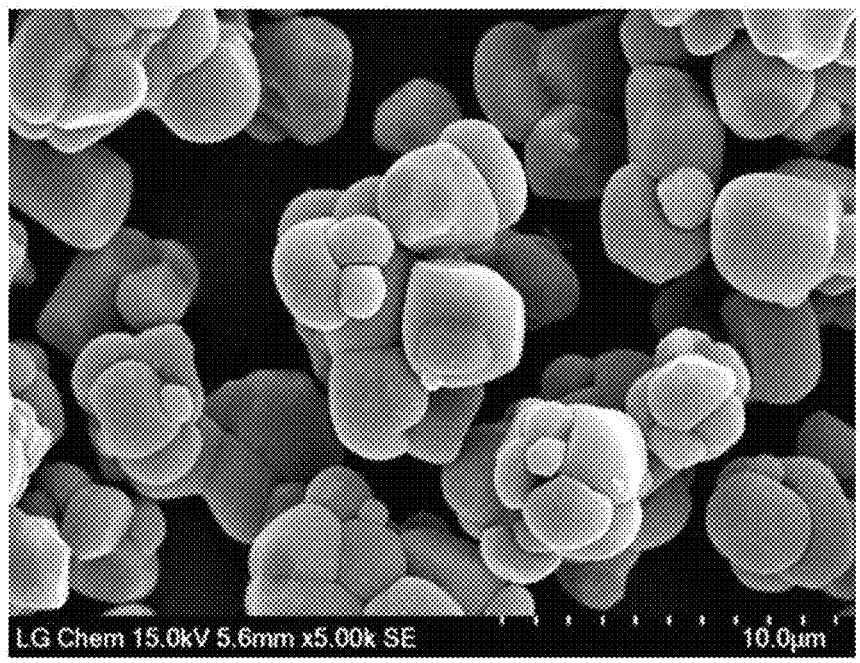
FIGS. 1A to 1F show scanning electron microscopy (SEM) images of positive electrode active materials prepared in Examples 2, 4, 6, 8, 10, and 12, respectively.
Figure 1B:
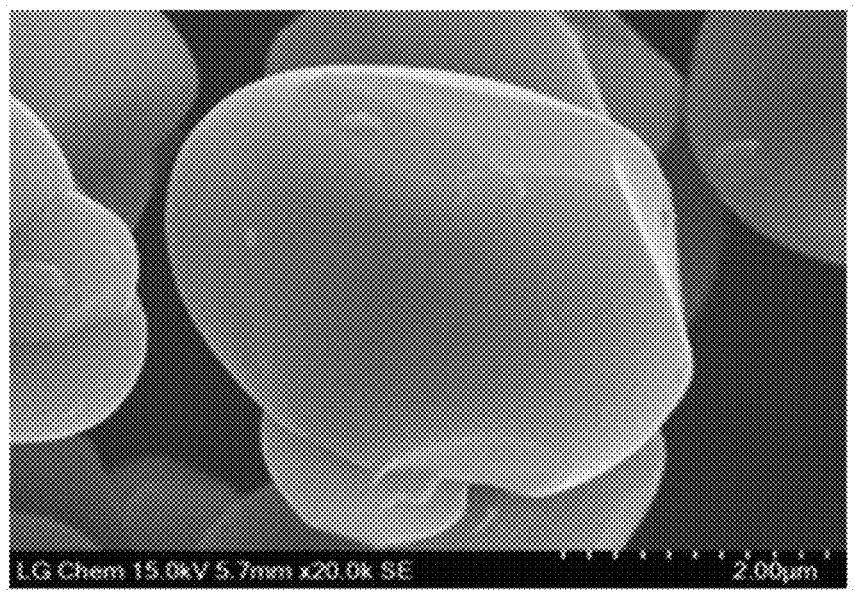
Figure 1C:
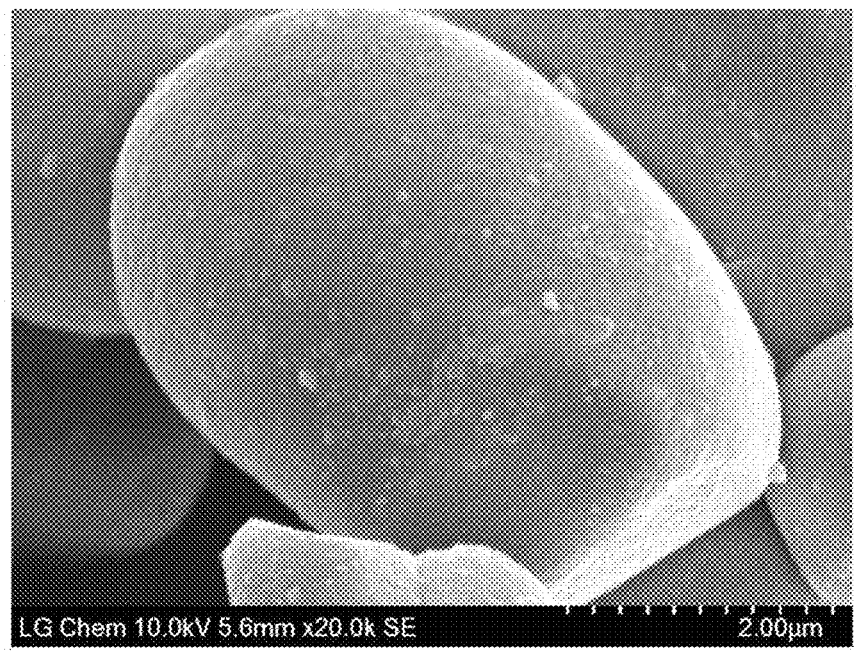
Figure 1D:
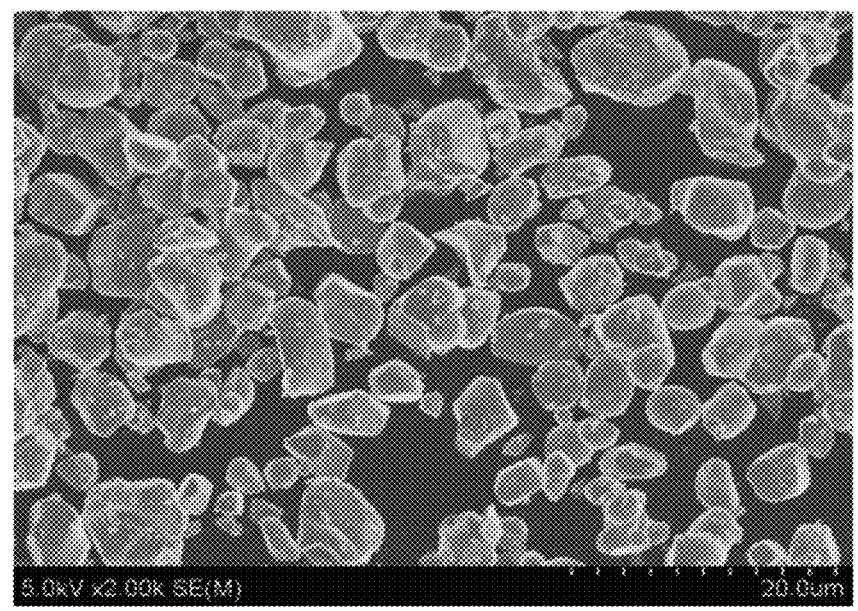
Figure 1E:
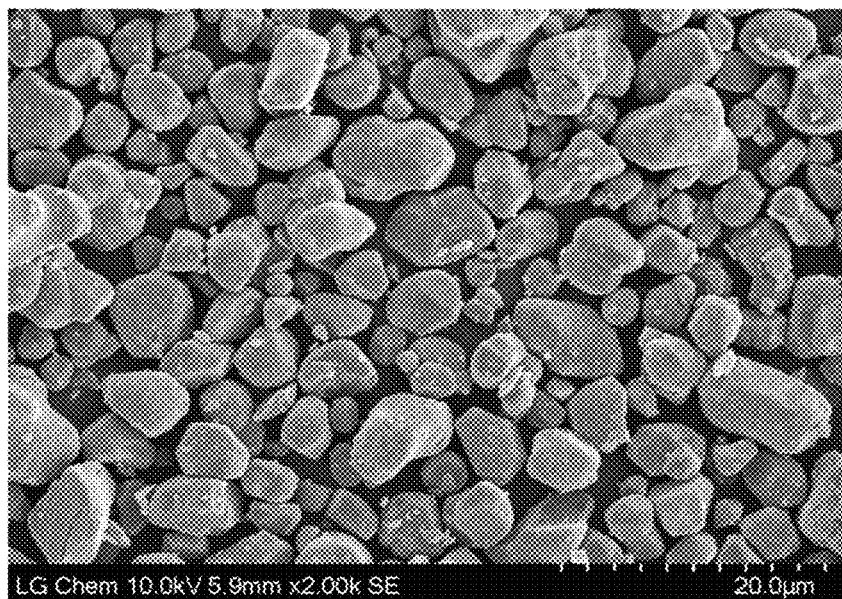
Figure 1F:
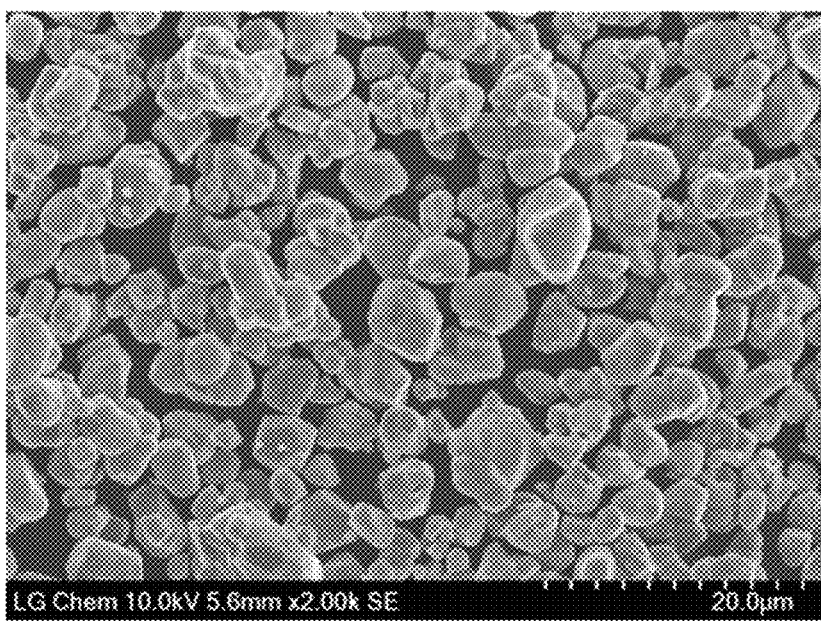

Hereinafter, a method of preparing a positive electrode active material for a lithium secondary battery, a positive electrode active material prepared by the method, a positive electrode including the positive electrode active material, and a lithium secondary battery according to specific embodiments of the present invention will be described.

In the present specification and claims, "including a plurality of crystal grains" means a crystal formed by two or more crystal particles having an average crystallite size in a particular range. In this regard, the crystallite size of the crystal grain may be quantitatively analyzed by X-ray diffraction (XRD) analysis with Cu Kα X-rays (X-rα). Specifically, the prepared particles are put in a holder, and diffraction grating obtained by irradiating X-rays onto the particles is analyzed, thereby quantitatively analyzing the average crystallite size of the crystal grain.

Further, in the present specification and claims, D50 may be defined as a particle size at 50% of a particle size distribution, and may be measured by using a laser diffraction method.

In addition, it will be understood that terms or words used in the specification and claims shall not be interpreted as the meaning defined in commonly used dictionaries, and the words or terms should be interpreted as having a meaning that is consistent with their meaning in the context of the relevant art and the technical idea of the invention, based on the principle that an inventor may properly define the meaning of the words or terms to best explain the invention.

Positive Electrode Active Material

In the present invention, two exemplary embodiments of a positive electrode active material in the form of single particle are provided.

Specifically, single particles of two exemplary embodiments may commonly include:

1) a single particle of a nickel-based lithium composite metal oxide;
2) a plurality of crystal grains, each having a size of 180 nm to 300 nm, as analyzed by X-ray diffraction (XRD) analysis with a Cu Kα X-ray (X-rα); and
3) a metal doped in the crystal lattice (one or more metals selected from the group consisting of M=Al, Ti, Mg, Zr, W, Y, Sr, Co, F, Si, Na, Cu, Fe, Ca, S, and B).
4) However, the single particles of two exemplary embodiments may be distinguished from each other by surface coating.
4-1) More specifically, the single particle of one exemplary embodiment (hereinafter referred to as a 'first single particle') includes the metal doped in the crystal lattice thereof (one or more metals selected from the group consisting of M=Al, Ti, Mg, Zr, W, Y, Sr, Co, F, Si, Na, Cu, Fe, Ca, S, and B), but the surface thereof is not coated.
4-2) The single particle of another exemplary embodiment (hereinafter referred to as a 'second single particle') includes the metal (one or more metals selected from the group consisting of M=Al, Ti, Mg, Zr, W, Y, Sr, Co, F, Si, Na, Cu, Fe, Ca, S, and B) doped in the crystal lattice thereof and a metal oxide (of one or more metals selected from the group consisting of M'=Al, Ti, Mg, Zr, W, Y, Sr, Co, F, Si, Na, Cu, Fe, Ca, S, and B) coated on the surface thereof.
4-3) However, in the first and second single particles, a total content of the metal doped in the crystal lattice thereof, and the metal of the metal oxide coated on the surface thereof, is controlled in the range of 2500 ppm to 6000 ppm. That is, since the first single particle does not include a metal oxide coated on the surface thereof, the content of the metal doped in the crystal lattice thereof is 2500 ppm to 6000 ppm. Further, in the second single particle, the total content of the metal doped in the crystal lattice thereof, and the metal of the metal oxide coated on the surface thereof, is 2500 ppm to 6000 ppm.

The first and second single particles may have the characteristics of 1) to 4), thereby contributing to improvement of lifetime characteristics of a battery at a high voltage.

Hereinafter, the characteristics of 1) to 4) of the first and second single particles will be described in detail.

Shape of Particle and Size of Crystal Grain

1) Generally, a nickel-based lithium composite metal oxide is a secondary particle, but the first and second single particles are a nickel-based lithium composite metal oxide embodied in the form of single particle.

Specifically, a nickel-based lithium composite metal hydroxide secondary particle prepared by co-precipitation is used as a precursor, this precursor is mixed with a lithium raw material, and this mixture is calcined at a temperature of lower than 960° C. to obtain a nickel-based lithium composite metal oxide secondary particle.

However, when the calcination temperature is increased to 960° C. or higher, the particle no longer has a secondary particle form, and single particles of the nickel-based lithium composite metal oxide may be obtained. This resulting product may be used as the single particles of the first and second embodiments.

2) Meanwhile, the nickel-based lithium composite metal oxide secondary particle and the single particles of the two embodiments include a plurality of crystal grains, regardless of the calcination temperature. Here, "including a plurality of crystal grains" means a crystal formed by two or more crystal particles having an average crystallite size in a particular range. In this regard, the crystallite size of the crystal grain may be quantitatively analyzed by X-ray diffraction (XRD) analysis with a Cu Kα X-ray (X-rα). Specifically, the prepared particles are put in a holder, and diffraction grating obtained by irradiating X-rays onto the particles is analyzed, thereby quantitatively analyzing the average crystallite size of the crystal grain.

However, depending on the calcination temperature, a difference may occur in the crystal grain size. Specifically, when calcination is performed at a low temperature of lower than 960° C., crystal grains having a size of less than 180 nm may be produced. That is, when the size of crystal grains is less than 180 nm, it is difficult to obtain a single particle having a perfect shape. As a result, there is a concern that the interface between a positive electrode active material and an electrolyte may become large, and contact between the particles and the electrolyte may be increased due to a volume change during charge/discharge. Further, when the average crystallite size of the particle exceeds 300 nm, there is a concern that the capacity may be reduced due to enlargement of the crystal grains.

In contrast, when the single particles of the first and second embodiments are excessively calcined at a temperature of 960° C. or higher, specifically at 960° C. to 1100° C., for example at 990° C. to 1100° C., coarsening of crystal grains may occur, and therefore single particles having a size of up to 180 nm to 300 nm may be included.

As such, the first and second single particles including the coarsened crystal grains (180 nm to 300 nm) have a lower specific surface area (BET) than the nickel-based lithium composite metal oxide secondary particle including smaller crystal grains, and therefore its reactivity with an electrolyte is low, and gas generation and release of internal metals may be reduced.

Generally, as the calcination temperature increases, the size of the single particle and the size of the crystal grain in the single particle increase at the same composition, regardless of the particle shape. However, the results of X-ray diffraction analysis with a Cu Kα X-ray (X-rα) shows that the crystal grains in the single particles of the two embodiments have a larger size when they are over-calcined at a temperature of 990° C. (Examples 1 to 6) than those over-calcined at a temperature of 1010° C. (Examples 7 to 12) with the same composition. This is because the patterns resulting from over-calcination at 1010° C. (Examples 7 to 12) are related to an aggregation degree of single particles according to the calcination temperature and a measuring device, rather than being out of the general tendency.

When single particles are over-calcined at 990° C. (Examples 1 to 6), relatively small single particles may aggregate together and look like secondary particles. That is, it is understood that XRD recognizes the secondary particle-like look, and recognizes boundaries between the single particles as grain boundaries to detect the single particle size as the crystal grain size.

Unlike this, when single particles are over-calcined at 1010° C. (Examples 7 to 12), relatively large single particles may be separately observed while maintaining a distance from each other. Therefore, it is understood that XRD recognizes individual single particles, and correctly recognizes the crystal grain size in the single particles.

Average Particle Size (D50) and Crystal Structure

There are differences in the average particle size (D50) and the crystal structure between the nickel-based lithium composite metal oxide secondary particles and the single particles of the two embodiments.

The average particle size (D50) of the nickel-based lithium composite metal oxide secondary particles may be 10 μm to 18 μm, and the average particle size (D50) of the single particles of the two embodiments may be 3.5 μm or more to 8 μm or less.

As D50 of particles decreases, a BET specific surface area of an active material increases. However, BET reduction due to the increase of the crystal grain size caused by the over-calcination is predominant, as compared to BET increase due to reduction of the particle size. As a result, the interface between an electrolyte and a positive electrode active material may be minimized to reduce side reactions and to improve battery performance. Further, by preparing the active material as small particles, capacity and efficiency may be increased and single particles may be more easily prepared.

When the average particle size (D50) of the single particles of the two embodiments is less than 3.5 μm, there are concerns about reduction in durability of the electrolyte and the positive electrode active material. When the average particle size (D50) of the single particles of the two embodiments is more than 8 μm, there are concerns about capacity reduction due to over-calcination and reduction of lifetime characteristics. Therefore, the average particle size (D50) of the single particles of the two embodiments may be controlled in the range of 3.5 μm or more to 8 μm or less.

Meanwhile, the crystal lattice structure of the nickel-based lithium composite metal oxide secondary particles may have a layered structure throughout the interior thereof. This is attributed to uniform formation of a layered structure of lithium (Li) layer—cation mixing layer—lithium (Li) layer—cation mixing layer from the surface of the particle toward the center of the particle at a temperature of less than 960° C.

In contrast, the single particles of the two embodiments may have different crystal structures at the central part thereof and the surface part thereof. This is attributed to the structural change of the particle surface from the layered structure to a rock salt structure, a spinel structure, or a mixed structure thereof at a temperature of 960° C. or higher. Specifically, at a temperature of 960° C. or higher, 960° C. to 1100° C., or for example 990° C. to 1100° C., loss of part of lithium occurs on the surface of the nickel-based lithium composite metal oxide single particles, and $Ni^{2+}$ ions of the lower part thereof move to the underlying lithium (Li) layer, that is, degeneration of the cation mixing layer successively occurs. These successive reactions may occur from the surface of the nickel-based lithium composite metal oxide single particles to a particular depth.

Specifically, the single particles of the two embodiments may have a surface part and a central part which are different from each other in the crystal lattice structure.

More specifically, the surface part of the single particles of the two embodiments may include a rock salt structure, a spinel structure, or a mixed structure thereof from the surface of the individual single particle to a depth of 0.13% to 5.26%, for example of a depth of 0.13% to 2.63% of the radius of the individual single particle. Meanwhile, the central part of the single particles of the two embodiments may have a layered structure from the interface with the surface part to the center of the single particle.

The surface part of the rock salt structure, the spinel structure, or the mixed structure thereof of the single particles of the two embodiments may have low reactivity with an electrolyte, may be structurally stable, and may also maintain the structural stability even if a charge voltage of more than 4.2 V, 4.4 V or more, or 4.45 V or more is applied, as compared with the surface part of the layered structure of the nickel-based lithium composite metal oxide secondary particles.

Composition

3) The first single particle may include a metal (M) doped in the crystal structure of a lithium composite metal oxide represented by the following Chemical Formula 1; and the second single particle may include a metal compound coated on the surface of the single particle, together with the metal (M) doped in the crystal structure of lithium composite metal oxide represented by the following Chemical Formula 1:

$$Li_a(Ni_xMn_yCo_z)O_{2+b} \quad (1)$$

wherein, in Chemical Formula 1, a, x, y, and z represent a molar ratio of each element in the lithium composite metal oxide.

The metal (M) doped in the crystal lattice of the first and second single particles and the metal (M') of the metal compound coated on the surface of the second single particle may be the same as or different from each other, and each may be one or more metals selected from the group consisting of Al, Ti, Mg, Zr, W, Y, Sr, Co, F, Si, Na, Cu, Fe, Ca, S, and B.

In the first and second single particles, the element (M) may be located only on part of the surface of the particle depending on the positional preference of the element M, and may be located with a concentration gradient from the surface of the particle toward the center of the particle, or may uniformly exist throughout the particle.

When the first and second single particles are doped, or coated and doped, with the same element (M), high voltage characteristics of the active material may be further improved due to stabilization of the surface structure. Among the elements, the element (M), specifically, three elements of Ti, Mg, and Zr, may be doped, or coated and doped, or Zr alone may be doped, or coated and doped, in terms of excellent surface structure-stabilizing effects.

The element (M) may be doped, or coated and doped, in an amount of 2500 ppm to 6000 ppm. When the amount of the element (M) is less than 2500 ppm, the structure-stabilizing effect according to doping or coating of the element (M) may be slight, and when the amount of the element (M) is more than 6000 ppm, there are concerns about capacity reduction and deterioration of lifetime characteristics and rate characteristics due to increased resistance. The element (M) may be coated or doped in a specific amount of 2500 to 5500 ppm, and more specifically, 3500 ppm to 5000 ppm, in terms of an excellent improvement effect by control of the element (M) content.

Meanwhile, Chemical Formula 1 may follow a composition of a generally known nickel-based lithium composite metal oxide secondary particle.

For example, in Chemical Formula 1, lithium (Li) may be included in an amount corresponding to a, specifically $0.95 \leq a \leq 1.2$. When a is less than 0.95, there are concerns about deterioration of output characteristics of a battery due to an increase of interface resistance generated at the contact interface between the positive electrode active material and the electrolyte. On the contrary, when a is more than 1.2, there are concerns about reduction of an initial discharge capacity of a battery. In terms of the effects of combination with the characteristic structure of the active material according to one embodiment of the present invention, a may more specifically satisfy $0.98 \leq a < 1.07$, and much more specifically $a=1$.

In Chemical Formula 1, nickel (Ni) is an element that contributes to high voltage and high capacity of a secondary battery. The nickel (Ni) may be included in an amount corresponding to x, specifically, $0 < x < 0.6$, under conditions satisfying $x+y+z=1$. When x is 0, there are concerns about deterioration of charge/discharge capacity characteristics. When x is 0.6 or more, there are concerns about deterioration of structural and thermal stability of the active material, and as a result, deterioration of lifetime characteristics. In terms of high voltage and high capacity effects by control of the nickel content, the nickel may be specifically included in an amount of $0.4 \leq x < 0.6$, and more specifically $0.5 \leq x < 0.6$, under conditions satisfying $x+y+z=1$.

Further, in Chemical Formula 1, manganese (Mn) is an element that contributes to improvement of thermal stability of the active material, and it may be included in an amount corresponding to y, specifically $0 \leq y \leq 0.4$, under conditions satisfying $x+y+z=1$. When y is more than 0.4, there are concerns about deterioration of lifetime characteristics due to increased release of manganese. In terms of improvement of thermal stability of the active material and improvement of lifetime characteristics by control of the manganese content, the manganese may more specifically be included in an amount of $0.1 \leq y < 0.4$, and much more specifically $0.1 \leq y \leq 0.3$, under conditions satisfying $x+y+z=1$.

Further, in Chemical Formula 1, cobalt (Co) is an element that contributes to improvement of charge/discharge cycle characteristics of the active material, and it may be included in an amount corresponding to z, specifically $0 \leq z < 1$, under conditions satisfying $x+y+z=1$. When z is 1, there are concerns about deterioration of charge/discharge capacity due to deterioration of structural stability. In terms of improvement of cycle characteristics of the active material by control of the cobalt content, the cobalt may be more specifically included in an amount of $0.1 \leq z < 0.4$, and much more specifically $0.1 \leq z \leq 0.3$.

That is, Chemical Formula 1 may satisfy $a=1$, $0 \leq b \leq 0.02$, $0.4 \leq x < 0.6$, $0.1 \leq y < 0.4$, $0.1 \leq z < 0.4$, and $x+y+z=1$, and more specifically, $LiNi_{0.5}Co_{0.2}Mn_{0.3}O_2$, $LiNi_{0.5}Co_{0.3}Mn_{0.2}O_2$, or the like. Among them, any one or a mixture of two or more thereof may be included in the positive electrode active material.

Method of Preparing Positive Electrode Active Material

The present invention provides a method of preparing the single particles of the two embodiments.

Specifically, the first single particle may be prepared by a series of processes including the steps of:

preparing a first mixture including a lithium composite metal hydroxide particle having D50 of 8 μm or less, a lithium raw material, and a metal (one or more selected from the group consisting of M=Al, Ti, Mg, Zr, W, Y, Sr, Co, F, Si, Na, Cu, Fe, Ca, S, and B) compound; and calcining the first mixture at a temperature of 960° C. or higher.

In the step of calcining the first mixture at a temperature of 960° C. or higher, the nickel-based lithium composite metal oxide single particle including a plurality of crystal grains may be synthesized, and at the same time, the metal (M) of the metal (M) compound may be doped in the crystal lattice of the lithium composite metal oxide single particle, thereby obtaining the first single particle.

Considering the content of the metal doped in the first single particle finally obtained, the content of the metal (M) compound in the total weight of the first mixture may be controlled in the range of 2500 ppm to 6000 ppm.

Meanwhile, the second single particle may be prepared by a series of processes including the steps of:

preparing a first mixture including a nickel-based lithium composite metal hydroxide particle having D50 of 8 μm or less, a lithium raw material, and a metal (one or more selected from the group consisting of M=Al, Ti, Mg, Zr, W, Y, Sr, Co, F, Si, Na, Cu, Fe, Ca, S, and B) compound;

calcining the first mixture at a temperature of 960° C. or higher;

preparing a second mixture including a calcined product of the first mixture and a metal (one or more selected from the group consisting of M'=Al, Ti, Mg, Zr, W, Y, Sr, Co, F, Si, Na, Cu, Fe, Ca, S, and B) compound; and calcining the second mixture at a temperature of 350° C. to 800° C.

Like in the preparation of the first single particle, in the step of calcining the first mixture at a temperature of 960° C. or higher during the preparation of the second single particle, the nickel-based lithium composite metal oxide single particle including a plurality of crystal grains may be synthesized, and at the same time, the metal (M) of the metal (M) compound may be doped in the crystal lattice of the lithium composite metal oxide single particle.

However, unlike the preparation of the first single particle, the step of calcining the second mixture at a temperature of 350° C. to 800° C. may be further performed after preparing the second mixture including the calcined product of the first mixture and the metal (M') compound, thereby obtaining the second single particle.

Further, the total content of the metal (M) compound and the metal (M') compound in the total weight of the first mixture and the second mixture may be 2500 ppm to 6000 ppm.

With regard to the method of preparing the first or second single particle, those overlapped with the above-described explanations will be excluded, and process features will be described in detail.

Calcination Process

During the preparation of the first and second single particles, when the first mixture, that is, the mixture of the lithium composite metal hydroxide particle having D50 of 8 µm or less, the lithium raw material, and the metal (M) compound is calcined at a temperature of 960° C. or higher, the lithium composite metal oxide single particle including a plurality of crystal grains may be synthesized, and at the same time, the metal (M) of the metal (M) compound may be doped in the crystal lattice of the lithium composite metal oxide single particle.

The calcination temperature may be controlled to a temperature of 960° C. or higher, considering the above-described factors such as single particle preparation, size control of crystal grains, etc. More specifically, the calcination temperature may be controlled at a temperature of 960° C. to 1100° C., for example 990° C. to 1100° C. In particular, when the composition of Ni is less than 0.6, over-calcination may not occur at a temperature of lower than 960° C. Therefore, when the calcination temperature is lower than 960° C., D50 of the active material to be prepared is not as large as the range according to the present invention, and thus there are concerns about deterioration of battery performance due to side reactions between the electrolyte and the positive electrode active material at a high SOC. On the contrary, when the calcination temperature is higher than 1100° C., it is not preferable in that the capacity may be reduced due to enlargement of the crystal grains.

The over-calcination process may be performed in an oxidizing atmosphere containing oxygen, and more specifically, in an atmosphere having an oxygen content of 20 vol % or more.

The lithium composite metal hydroxide particle having D50 of 8 µm or less may be a precursor for the preparation of the above-described single particle of one embodiment, which is represented by the following Chemical Formula 2:

$$(Ni_xMn_yCo_z)OH_{2+b} \quad (2)$$

wherein, in Chemical Formula 2, $0.95 \leq a \leq 1.2$, $0 \leq b \leq 0.02$, $0 < x < 0.6$, $0 \leq y \leq 0.4$, $0 \leq z < 1$, and $x+y+z=1$.

The average particle size (D50) of the lithium composite metal hydroxide particle may more specifically be 4 µm or more to 8 µm or less. When the positive electrode active material is prepared using the precursor having a size in the above range, it is possible to prepare a positive electrode active material having D50 of 4 µm or more to 8 µm or less in the form of a single particle.

Specifically, the lithium composite metal hydroxide particle having D50 of 8 µm or less as a precursor may be an oxide, hydroxide, or oxyhydroxide containing nickel, cobalt, and manganese.

The precursor may be prepared according to a common method, except that the raw materials of nickel, cobalt, and manganese are used in amounts defined in Chemical Formula 1, and the average particle size (D50) of the finally prepared precursor is 7 µm or less. For example, the precursor may be prepared by a solid-phase method of mixing nickel oxide, cobalt oxide, and manganese oxide, and then performing heat treatment, or prepared by a co-precipitation method of adding respective metal salts containing nickel, cobalt, and manganese to a solvent, specifically, water or a mixture of water and an organic solvent that is miscible with water (specifically, an alcohol, etc.).

Further, the lithium raw material may be lithium-containing oxide, sulfate, nitrate, acetate, carbonate, oxalate, citrate, halide, hydroxide, oxyhydroxide, etc., and specifically, $Li_2CO_3$, $LiNO_3$, $LiNO_2$, $LiOH$, $LiOH \cdot H_2O$, $LiH$, $LiF$, $LiCl$, $LiBr$, $LiI$, $CH_3COOLi$, $Li_2O$, $Li_2SO_4$, $CH_3COOLi$, $Li_3C_6H_5O_7$, etc. Any one of them or a mixture of two or more thereof may be used. Among them, the lithium raw material may be $Li_2O$ or $Li_2CO_3$, in terms of reaction efficiency and reduction of by-product production upon reaction with the precursor for forming the lithium composite metal oxide.

Further, the raw material of the doping element M may be an element M-containing oxide, sulfate, nitrate, acetate, carbonate, oxalate, citrate, halide, hydroxide, oxyhydroxide, etc. In this regard, M is the same as described above.

The precursor for forming the lithium composite metal oxide, the lithium raw material, and the raw material of element M or M' may be used after being mixed in amounts satisfying the content range of the lithium in the finally prepared lithium composite metal oxide of Chemical Formula 1 and the content range of the element M (corresponding to a sum of M and M' in the preparation method) included in the positive electrode active material.

Coating Process

The method of preparing the second single particle may further include the steps of preparing a second mixture including the calcined product of the first mixture and a metal (one or more metals selected from the group consisting of an M'=Al, Ti, Mg, Zr, W, Y, Sr, Co, F, Si, Na, Cu, Fe, Ca, S, and B) compound, and calcining the second mixture at a temperature of 350° C. to 800° C., after the step of calcining the first mixture at a temperature of 960° C. or higher.

When this process is further included, a coating layer containing the metal (M') compound may be formed on all or part of the surface of the single particle, and the metal compound may be, for example, in the form of a metal oxide.

In this regard, the coating element M' may be an element that is the same as or different from the doping element M. Further, the raw material of the coating element M' may be an element M'-containing oxide, sulfate, nitrate, acetate, carbonate, oxalate, citrate, halide, hydroxide, oxyhydroxide, etc. In this regard, M is the same as described above. An additional heat treatment process of forming the coating layer may be performed at a temperature of 350° C. to 800° C., more specifically at a temperature of 350° C. to 650° C., in an oxidizing atmosphere containing oxygen, as in the doping process.

When the secondary heat treatment temperature for additional coating is lower than 350° C., the coating layer may not be sufficiently formed, and when the temperature is higher than 800° C., there are problems of cation mixing and deterioration of capacity and rate characteristics.

Post-Treatment Process

Meanwhile, a cooling process may be optionally performed after the over-calcination during the preparation of the first single particle and after the secondary heat treatment during the preparation of the second single particle.

The cooling process may be performed according to a common method, specifically, by a method such as natural cooling in an air atmosphere or hot air cooling.

Since the positive electrode active material for a lithium secondary battery prepared according to the above-described preparation method may have a reduced specific surface area (BET), an interface with an electrolyte may be reduced. In addition, the amount of residual lithium in the active material is reduced due to over-calcination, and thus side-reaction with an electrolyte may be reduced. Accordingly, the positive electrode active material may exhibit excellent battery performance and lifetime characteristics when the battery is operated at a high voltage of 4.35 V or more, and in particular, it may exhibit excellent high-temperature lifetime characteristics due to structural stability.

Lithium Secondary Battery

Still another embodiment of the present invention provides a positive electrode for a lithium secondary battery, the positive electrode including the positive electrode active material including any one of the single particles of the two embodiments, and a lithium secondary battery including the positive electrode.

The positive electrode and the lithium secondary battery each prepared by using the above-described positive electrode active material may exhibit excellent lifetime characteristics even at a high SOC.

Specifically, the positive electrode may include a positive electrode collector and a positive electrode active material layer which is formed on the positive electrode collector and includes the above-described positive electrode active material.

The positive electrode collector is not particularly limited as long as it has conductivity without causing chemical changes in a battery. For example, stainless steel, aluminum, nickel, titanium, calcined carbon, and aluminum or stainless steel that is surface-treated with carbon, nickel, titanium, or silver may be used. The positive electrode collector may have a thickness of 3 μm to 500 μm, and adhesion of the positive electrode active material may be increased by forming fine roughness on the surface of the collector. For example, the collector may be in a variety of forms such as a film, a sheet, a foil, a net, a porous material, a foamed material, a non-woven fabric material, etc.

Further, the positive electrode active material layer may include a conductive material and a binder together with the above-described positive electrode active material.

In this regard, the conductive material is used to provide an electrode with conductivity, and is not particularly limited as long as it has electrical conductivity without causing chemical changes in the battery. Specific examples thereof may include carbon-based materials such as carbon black, acetylene black, Ketjen black, channel black, furnace black, lamp black, thermal black, carbon fibers, etc.; graphite such as natural or artificial graphite; metallic powders or metallic fibers of copper, nickel, aluminum, silver, etc.; conductive whiskers such as zinc oxide, potassium titanate, etc.; conductive metal oxides such as titanium oxide; or conductive polymers such as polyphenylene derivatives, etc. These may be used alone or in a mixture of two or more thereof. The conductive material may be included in an amount of 1% by weight to 30% by weight with respect to the total weight of the positive electrode active material layer.

Further, the binder functions to improve adhesion between the positive electrode active materials, and adhesive force between the positive electrode active material and the collector. Specific examples thereof may include polyvinylidene fluoride (PVDF), a vinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinyl pyrrolidone, tetrafluoroethylene, polyethylene, polypropylene, an ethylene-propylene-diene polymer (EPDM), sulfonated-EPDM, styrene butadiene rubber (SBR), fluorine rubber, or combinations thereof. These may be used alone or in a mixture of two or more thereof. The binder may be included in an amount of 1% by weight to 30% by weight with respect to the total weight of the positive electrode active material layer.

The positive electrode may be manufactured according to a common method of manufacturing a positive electrode, except that the above-described positive electrode active material is used. Specifically, the positive electrode may be manufactured by applying a slurry for forming a positive electrode active material layer onto a positive electrode collector, followed by drying and rolling, in which the slurry is prepared by mixing the above-described positive electrode active material and optionally the binder, and the conductive material in a solvent. In this regard, the kind and content of the positive electrode active material, the binder, and the conductive material are the same as described above.

The solvent may be a solvent generally used in the art, and may include dimethyl sulfoxide (DMSO), isopropyl alcohol, N-methylpyrrolidone (NMP), acetone, water, etc. These may be used alone or in a mixture of two or more thereof. In consideration of the coating thickness of the slurry and the production yield, the solvent may be used in an amount sufficient to dissolve or disperse the positive electrode active material, the conductive material, and the binder, and to allow the slurry to have a viscosity suitable for excellent uniformity of thickness when applied for manufacturing the positive electrode.

As an alternative method, the positive electrode may be manufactured by casting the slurry for forming the positive electrode active material layer on a separate support, and then laminating a film peeled off from the support on the positive electrode collector.

Still another embodiment of the present invention provides an electrochemical device including the positive electrode. The electrochemical device may specifically be a battery, a capacitor, etc., and more specifically, a lithium secondary battery.

The lithium secondary battery may specifically include a positive electrode, a negative electrode facing the positive electrode, a separator interposed between the positive electrode and the negative electrode, and an electrolyte. The positive electrode is the same as described above. Also, the lithium secondary battery may optionally further include a battery container accommodating an electrode assembly composed of the positive electrode, the negative electrode, and the separator, and a sealing member for sealing the battery container.

In the lithium secondary battery, the negative electrode includes a negative electrode collector and a negative electrode active material layer disposed on the negative electrode collector.

The negative electrode collector is not particularly limited as long as it has high conductivity without causing chemical changes in a battery. For example, copper, stainless steel, aluminum, nickel, titanium, calcined carbon, or copper or stainless steel that is surface-treated with carbon, nickel, titanium, or silver, or an aluminum-cadmium alloy, may be used. Also, the negative electrode collector may commonly have a thickness of 3 μm to 500 μm, and like the positive electrode collector, adhesion of the negative electrode active material may be increased by forming fine roughness on the surface of the collector. For example, the collector may be in a variety of forms such as a film, a sheet, a foil, a net, a porous material, a foamed material, a non-woven fabric material, etc.

Further, the negative electrode active material layer may optionally include a binder and a conductive material together with the negative electrode active material. The negative electrode active material layer may be prepared, for example, by applying and drying a slurry for forming the negative electrode on the negative electrode collector, the slurry being prepared by mixing the negative electrode active material, and optionally the binder, and the conductive material in a solvent, or by casting a composition for forming the negative electrode on a separate support, and then laminating a film peeled off from the support on the negative electrode collector.

The negative electrode active material may be a compound that is capable of reversible intercalation and deintercalation of lithium. Specific examples thereof may include any one or a mixture of two or more of a carbon material such as artificial graphite, natural graphite, graphitized carbon fiber, amorphous carbon, etc.; a metal compound that is capable of alloying with lithium, such as Si, Al, Sn, Pb, Zn, Bi, In, Mg, Ga, Cd, a Si alloy, a Sn alloy, an Al alloy, etc.; a metal oxide that is capable of doping and dedoping lithium ions, such as $SiO_x$ (0<x<2), $SnO_2$, vanadium oxide, or lithium vanadium oxide; and a composite including the metal compound and the carbon material, such as a Si—C composite or a Sn—C composite. Also, the negative electrode active material may be a lithium metal thin film. In addition, low-crystallinity carbon, high-crystallinity carbon, etc. may all be used as the carbon material. The low-crystallinity carbon is represented by soft carbon or hard carbon, and the high-crystallinity carbon is represented by high-temperature calcined carbon such as amorphous, platy, flake, spherical, or fibrous natural graphite or artificial graphite, Kish graphite, pyrolytic carbon, mesophase pitch-based carbon fiber, mesocarbon microbeads, mesophase pitches, petroleum or coal tar pitch-derived cokes, or the like.

In addition, the binder and the conductive material may be the same as those described in the positive electrode.

Meanwhile, in the lithium secondary battery, the separator serves to separate the negative electrode and the positive electrode and to provide a flow passage for lithium ions. The separator is not particularly limited as long as it is used as a separator in a common lithium secondary battery, and particularly, a separator which exhibits low resistance to migration of electrolyte ions and has an excellent ability of absorbing an electrolyte solution is preferred. Specifically, the separator may be a porous polymer film made of a polyolefin-based polymer such as an ethylene homopolymer, a propylene homopolymer, an ethylene/butene copolymer, an ethylene/hexene copolymer, an ethylene/methacrylate copolymer, or the like, or a stacked structure having two or more layers thereof. Alternatively, the separator may be a common porous non-woven fabric, for example, a non-woven fabric made of glass fiber with a high melting point, polyethylene terephthalate fiber, or the like. Also, in order to ensure heat resistance or mechanical strength, the separator may be a coated separator including ceramic components or polymer materials, and optionally, may be used in a single-layer or multi-layer structure.

In addition, the electrolyte used in the present invention may be an organic liquid electrolyte, an inorganic liquid electrolyte, a solid polymer electrolyte, a gel polymer electrolyte, an inorganic solid electrolyte, a molten-type inorganic electrolyte, etc., which may be used in the manufacture of a lithium secondary battery, but the present invention is not limited thereto.

Specifically, the electrolyte may include an organic solvent and a lithium salt.

The organic solvent is not particularly limited as long as it may act as a medium capable of migrating ions involved in an electrochemical reaction of a battery. Specifically, the organic solvent may be an ester-based solvent such as methyl acetate, ethyl acetate, γ-butyrolactone, ε-caprolactone, etc.; an ether-based solvent such as dibutyl ether, tetrahydrofuran, etc.; a ketone-based solvent such as cyclohexanone, etc.; an aromatic hydrocarbon-based solvent such as benzene, fluorobenzene, etc.; a carbonate-based solvent such as dimethyl carbonate (DMC), diethyl carbonate (DEC), methyl ethyl carbonate (MEC), ethyl methyl carbonate (EMC), ethylene carbonate (EC), propylene carbonate (PC), etc.; an alcohol-based solvent such as ethyl alcohol, isopropyl alcohol, etc.; nitriles such as R—CN (where R is a C2 to C20 hydrocarbon group with a linear, branched, or cyclic structure, and may include a double-bond aromatic ring or an ether linkage), etc.; amides such as dimethylformamide, etc.; dioxolanes such as 1,3-dioxolane, etc.; or sulfolane. Among these compounds, the carbonate-based solvent is preferred, and a mixture of a cyclic carbonate (e.g., ethylene carbonate, propylene carbonate, etc.) having high ionic conductivity and a high dielectric constant, which is capable of increasing the charging and discharging performance of a battery, and a linear carbonate-based compound with low viscosity (e.g., ethyl methyl carbonate, dimethyl carbonate, diethyl carbonate, etc.) is more preferred. In this case, when the cyclic carbonate and chain carbonate are used after being mixed at a volume ratio of about 1:1 to about 1:9, excellent performance of the electrolyte may be exhibited.

The lithium salt is not particularly limited as long as it may provide lithium ions used in a lithium secondary battery. Specifically, the lithium salt may be $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, $LiB(C_2O_4)_2$, etc. The concentration of the lithium salt is preferably within a range of 0.1 M to 2.0 M. When the concentration of the lithium salt is within the above range, an electrolyte has appropriate conductivity and viscosity, and thus excellent performance of the electrolyte may be exhibited and lithium ions may be effectively migrated.

In addition to the electrolyte components, for the purpose of improving lifetime characteristics of the battery, suppressing a decrease in battery capacity, improving discharge capacity of the battery, etc., the electrolyte may further include one or more additives such as a haloalkylene carbonate-based compound such as difluoroethylene carbonate, etc., pyridine, triethyl phosphite, triethanolamine, a cyclic ether, ethylene diamine, n-glyme, hexaphosphoric triamide, nitrobenzene derivatives, sulfur, quinoneimine dyes, N-substituted oxazolidinone, N,N-substituted imidazolidine, ethylene glycol dialkyl ethers, ammonium salts, pyrrole, 2-methoxyethanol, aluminum trichloride, etc. In this regard, the additives may be included in an amount of 0.1% by weight to 5% by weight with respect to the total weight of the electrolyte.

The lithium secondary battery including the positive electrode active material according to the present invention may stably exhibit excellent discharge capacity, output characteristics, and capacity retention rate, thereby being usefully applied in portable devices such as mobile phones, notebook PCs, digital cameras, etc., and electric vehicles such as a hybrid electric vehicles (HEV), etc.

Accordingly, still another embodiment of the present invention provides a battery module including the lithium secondary battery as a unit cell and a battery pack including the same.

The battery module or battery pack may be used as a power source of one or more medium- and large-sized devices such as a power tool, an electric car including an electric vehicle (EV), a hybrid electric vehicle, and a plug-in hybrid electric vehicle (PHEV), or a power storage system.

DETAILED DESCRIPTION OF THE EMBODIMENTS

Hereinafter, embodiments of the present invention will be described in detail so that one of ordinary skill in the art to which the present invention pertains can easily practice the present invention. However, the present invention may be implemented in various other forms and is not limited to the embodiments described herein. Further, methods used in experimental examples to measure physical properties of active materials or precursors are the same as described below.

1) Average particle size D50 (μm): Particle sizes at 50% and 10% of particle size distribution were measured for active materials or precursors by a laser diffraction method (Microtrac MT 3000), respectively.

2) Crystallite size (nm): Crystal grain sizes (Crystallite sizes, X-sizes) of single particles were measured using an X-ray diffraction analyzer (Bruker AXS D4-Endeavor XRD) for measuring XRD (X-Ray Diffraction) with a Cu Kα X-ray (X-rα).

3) Doping amount and metal amount in surface-coated metal compound: The amount of the doped metal and/or the amount of the metal in the surface-coated metal compound were/was measuring using an inductively coupled plasma spectrometer (ICP).

4) Evaluation of high-temperature characteristics of a 4.35 V full cell.

Each of the positive electrode active materials prepared in the following examples and comparative examples, a carbon black conductive material, and a PVdF binder were mixed at a weight ratio of 96:2:2 in an N-methyl pyrrolidone solvent to prepare a slurry for forming a positive electrode (viscosity: 5000 mPa·s), and the slurry was applied onto an aluminum collector having a thickness of 20 μm, dried, and rolled to fabricate a positive electrode.

Further, artificial graphite MCMB (mesocarbon microbeads) as a negative electrode active material, a carbon black conductive material, a PVDF binder, and a BM-L301 dispersing agent were mixed at a weight ratio of 96.5:0.75:1.25:1.5 in an N-methyl pyrrolidone solvent to prepare a slurry for forming a negative electrode, and the slurry was applied onto a copper collector to fabricate a negative electrode.

A porous polyethylene separator was interposed between the positive electrode and the negative electrode fabricated as above to fabricate an electrode assembly, the electrode assembly was placed inside a case, and then an electrolyte was injected into the case to fabricate a lithium secondary battery. In this regard, the electrolyte was prepared by dissolving 1.15 M of lithium hexafluorophosphate (LiPF$_6$) in an organic solvent consisting of ethylene carbonate/dimethyl carbonate/ethyl methyl carbonate (a mixture volume ratio of EC/DMC/EMC=3/4/3).

High-temperature lifetime retention rate (%): The lithium secondary batteries thus fabricated were charged at 45° C. at constant current/constant voltage (CC/CV) of 0.7 C to 4.35 V/38 mA, and then discharged at constant current (CC) of 0.5 C to 2.5 V, and a discharge capacity was measured. This procedure was repeated for 1 cycle to 100 cycles, and the results are shown in FIG. 5.

Examples 1 to 6 (Over-Calcination Temperature: 990° C.)

Example 1

94.91702 g of a Ni$_{0.5}$Co$_{0.3}$Mn$_{0.2}$(OH)$_2$ precursor having a particle size D50 of 4.2 μm, 38.86741 g of LiOH as a lithium raw material, and 0.444807 g of ZrO$_2$, 0.010392 g of MgO, and 0.02594 g of TiO$_2$ as raw materials of element M were dry-mixed, and then over-calcined at 990° C. to prepare a LiNi$_{0.5}$Co$_{0.3}$Mn$_{0.2}$O$_2$ positive electrode active material which was doped with 4000 ppm of Zr/Mg/Ti (3500 ppm of Zr, 250 ppm of Mg, and 250 ppm of Ti) with respect to the total weight of the positive electrode active material.

Example 2

A positive electrode active material doped with Zr/Mg/Ti was prepared in the same manner as in Example 1, except that a precursor of 5.2 μm was over-calcined at 990° C., and 4250 ppm of Zr/Mg/Ti (3500 ppm of Zr, 250 ppm of Mg, and 500 ppm of Ti) was doped.

Example 3

LiNi$_{0.5}$Co$_{0.3}$Mn$_{0.2}$O$_2$ doped with 4250 ppm of Zr/Mg/Ti of Example 2, 0.026291 g of Al$_2$O$_3$ as a raw material of element M', and 0.028722 g of B$_2$O$_3$ were mixed and calcined at 990° C. to prepare a doped positive electrode active material which was further coated with 900 ppm of Al/B (500 ppm of Al and 400 ppm of B).

Example 4

A positive electrode active material doped with Zr was prepared in the same manner as in Example 1, except that a precursor of 5.2 μm was over-calcined at 990° C., and 3500 ppm of Zr was doped by using 0.444807 g of ZrO$_2$ as a raw material of element M.

Example 5

A positive electrode active material doped with Zr was prepared in the same manner as in Example 1, except that a precursor of 5.2 μm was over-calcined at 990° C., and 5500 ppm of Zr was doped by using 0.698983 g of ZrO$_2$ as a raw material of element M.

Example 6

LiNi$_{0.5}$Co$_{0.3}$Mn$_{0.2}$O$_2$ doped with 4250 ppm of Zr/Mg/Ti of Example 2 and 0.078872 g of Al$_2$O$_3$ as a raw material of element M' were mixed and calcined at 990° C. to prepare a doped positive electrode active material which was further coated with 1500 ppm of Al.

Examples 7 to 12 (Over-Calcination Temperature: 1010° C.)

Example 7

A LiNi$_{0.5}$Co$_{0.3}$Mn$_{0.2}$O$_2$ positive electrode active material which was doped with 4000 ppm of Zr/Mg/Ti (3500 ppm of Zr, 250 ppm of Mg, and 250 ppm of Ti) with respect to the total weight of the positive electrode active material was prepared in the same manner as in Example 1 except that over-calcination was performed at a temperature of 1010° C. instead of 990° C. as in Example 1.

Example 8

A positive electrode active material doped with Zr/Mg/Ti was prepared in the same manner as in Example 1, except that over-calcination was performed at a temperature of 1010° C. instead of 990° C. as in Example 2, and 4250 ppm of Zr/Mg/Ti (3500 ppm of Zr, 250 ppm of Mg, and 500 ppm of Ti) was doped in the same manner as in Example 2.

Example 9

$LiNi_{0.5}Co_{0.3}Mn_{0.2}O_2$ doped with 4250 ppm of Zr/Mg/Ti was prepared in the same manner as in Example 3, except that over-calcination was performed at a temperature of 1010° C. instead of 990° C. as in Example 3. Thereafter, the doped positive electrode active material was further coated with 900 ppm of Al/B (500 ppm of Al and 400 ppm of B) in the same manner as in Example 3.

Example 10

A positive electrode active material doped with 3500 ppm of Zr was prepared in the same manner as in Example 4, except that over-calcination was performed at a temperature of 1010° C. instead of 990° C. as in Example 4.

Example 11

A positive electrode active material doped with 5500 ppm of Zr was prepared in the same manner as in Example 5, except that over-calcination was performed at a temperature of 1010° C. instead of 990° C. as in Example 5.

Example 12

$LiNi_{0.5}Co_{0.3}Mn_{0.2}O_2$ doped with 4250 ppm of Zr/Mg/Ti was prepared in the same manner as in Example 6, except that over-calcination was performed at a temperature of 1010° C. instead of 990° C. as in Example 6. Thereafter, the doped positive electrode active material was further coated with 1500 ppm of Al in the same manner as in Example 6.

Comparative Example 1

A positive electrode active material doped with 4250 ppm of Zr/Mg/Ti was prepared in the same manner as in Example 2, except that calcination was performed at a temperature of 920° C.

Comparative Example 2

A positive electrode active material doped with 4250 ppm of Zr/Mg/Ti was prepared in the same manner as in Example 2, except that calcination was performed at a temperature of 950° C.

Comparative Example 3

A positive electrode active material doped with 1500 ppm of Zr was prepared in the same manner as in Example 4, except that 1500 ppm of Zr was doped.

Comparative Example 4

A positive electrode active material doped with 7500 ppm of Zr was prepared in the same manner as in Example 4, except that 7500 ppm of Zr was doped.

Comparative Example 5

A $LiNi_{0.5}Co_{0.3}Mn_{0.2}O_2$ positive electrode active material was prepared in the same manner as in Example 4, except that no Zr-doping treatment was performed.

Comparative Example 6

A positive electrode active material doped with 4250 ppm of Zr/Mg/Ti was prepared in the same manner as in Example 2, except that a precursor of 11 μm was calcined at a temperature of 920° C.

Comparative Example 7

A positive electrode active material doped with 1500 ppm of Zr was prepared in the same manner as in Example 4, except that a precursor of 12 μm was over-calcined at a temperature of 960° C., and 1500 ppm of Zr was doped.

Experimental Example 1 (Confirmation of Crystal Grain Size by Cu Kα XRD Analysis)

Each of the active materials prepared in Examples 2, 4, 6, 8, 10, and 12 was observed and analyzed using a scanning electron microscope (SEM), etc., and the results are shown in FIG. 1A (Example 2), 1B (Example 4), 1C (Example 6), 1D (Example 8), 1E (Example 10), and 1F (Example 12). Further, crystal grain sizes of the positive electrode active materials of Examples 1 to 8 and 10 to 12, and Comparative Examples 1 to 7, were confirmed using an X-ray diffraction analyzer (Bruker AXS D4-Endeavor XRD), and the results are shown in the following Table 1.

In detail, the crystal grain sizes of the positive electrode active materials were calculated by performing X-ray diffraction analysis using a Cu source (Cu Kα), obtaining a full width at half maximum (FWHM) from the analysis results, and then putting the full width at half maximum into the following equation.

$$\tau = (K \cdot \lambda)/(\beta \cdot \cos \theta) \quad \text{[Equation]}$$

The above equation is widely known as the Scherrer equation, wherein K is a shape factor, usually 0.9 without a unit, λ is X-ray wavelength, β is a full width at half maximum of a peak having a maximum intensity, and θ is an angle of peak maximum. The corresponding values are put into the equation, thereby calculating the crystal grain size τ.

TABLE 1

| | Total amount of coating and doping (ppm) | Crystal grain size (nm) |
| --- | --- | --- |
| Example 1 | 4000 | 264 |
| Example 2 | 4250 | 233 |
| Example 3 | 5150 | 207 |
| Example 4 | 3500 | 225 |
| Example 5 | 5500 | 233 |
| Example 6 | 5750 | 229 |
| Example 7 | 4000 | 181 |
| Example 8 | 4250 | 194 |
| Example 10 | 3500 | 194 |

TABLE 1-continued

| | Total amount of coating and doping (ppm) | Crystal grain size (nm) |
|---|---|---|
| Example 11 | 5500 | 195 |
| Example 12 | 5750 | 206 |
| Comparative Example 1 | 4250 | 151 |
| Comparative Example 2 | 4250 | 178 |
| Comparative Example 3 | 1500 | 215 |
| Comparative Example 4 | 7500 | 239 |
| Comparative Example 5 | 0 | 232 |
| Comparative Example 6 | 4250 | 154 |
| Comparative Example 7 | 1500 | 199 |

Referring to FIGS. 1A to 1F, it was confirmed that the active materials prepared according to the present invention were prepared in the form of single particles having a particle size of 3.5 μm to 10 μm.

Further, referring to Table 1, it was confirmed that when a precursor having an average particle size of 7 μm or less was used, and over-calcination was performed at 960° C. or higher (Examples 1 to 12), the crystal grain size as measured by Cu Kα X-ray (X-rα) was relatively large in the range of 180 nm to 300 nm. In contrast, it was confirmed that when the calcination temperature was lower than 960° C. (Comparative Examples 1, 2, and 6), the crystal grain size was less than 180 nm, irrespective of the size of the precursor, indicating not being over-calcined.

Meanwhile, at the same compositions, it is common that as the calcination temperature increases, the size of the single particle and the size of the crystal grain in the single particle increase. However, according to results measured by Cu Kα X-ray (X-rα), the sizes of the crystal grains over-calcined at 960° C. (Examples 1 to 6), as measured by Cu Kα X-ray (X-rα), were larger than those of the crystal grains over-calcined at 1010° C. (Examples 7 to 12), when their compositions were the same as each other. This is because the patterns resulting from over-calcination at 1010° C. (Examples 7 to 12) are related to an aggregation degree of single particles according to the calcination temperature and a measuring device, rather than being out of the general tendency.

When single particles are over-calcined at 990° C. (Examples 1 to 6), relatively small single particles may aggregate together and look like secondary particles. That is, it is understood that XRD recognizes the secondary particle-like look, and recognizes boundaries between the single particles as grain boundaries to detect the single particle size as the crystal grain size.

Unlike this, when single particles are over-calcined at 1010° C. (Examples 7 to 12), relatively large single particles may be separately observed while maintaining a distance from each other. Therefore, it is understood that XRD recognizes individual single particles, and correctly recognizes the crystal grain size in the single particles.

In other words, those over-calcined at 1010° C. (Examples 7 to 12) showed the larger crystal grains than those over-calcined at 960° C. (Examples 1 to 6), as measured by Cu Kα X-ray (X-rα), which is attributed to limitations of the measuring device.

However, all of those over-calcined at 960° C. (Examples 1 to 6) and those over-calcined at 1010° C. (Examples 7 to 12) showed practical sizes of the crystal grains within the error range (±1%) of the value measured by Cu Kα X-ray (X-rα), that is, within the range of 180 nm to 300 nm.

Experimental Example 2 (Evaluation of Crystal Structure)

Figure 2A:
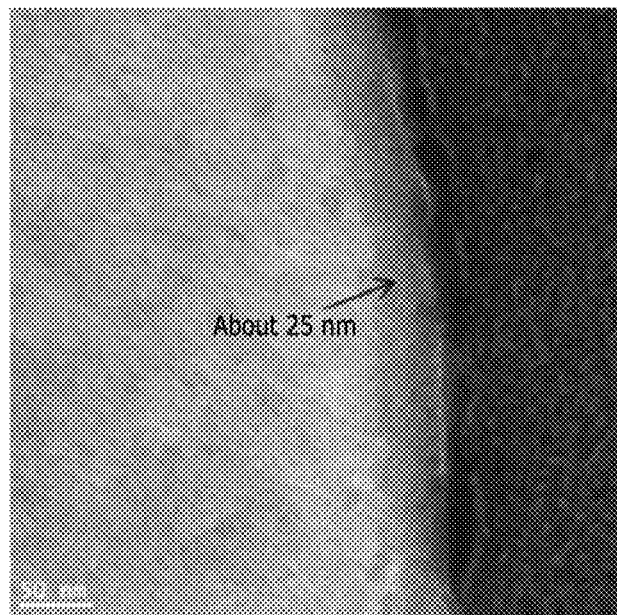
FIGS. 2A to 2G show images of TEM-ASTAR and HR-TEM of Example 2 and Comparative Example 1.
Figure 2B:
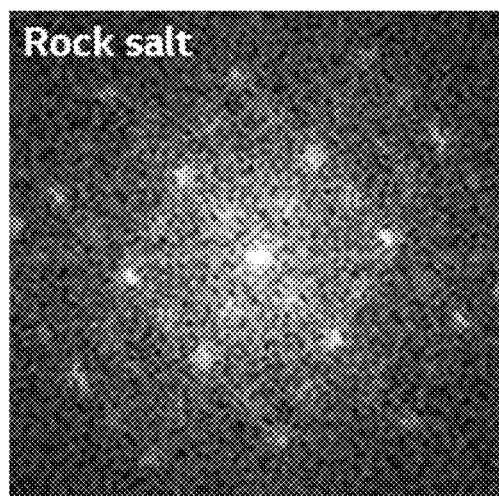
Figure 2C:
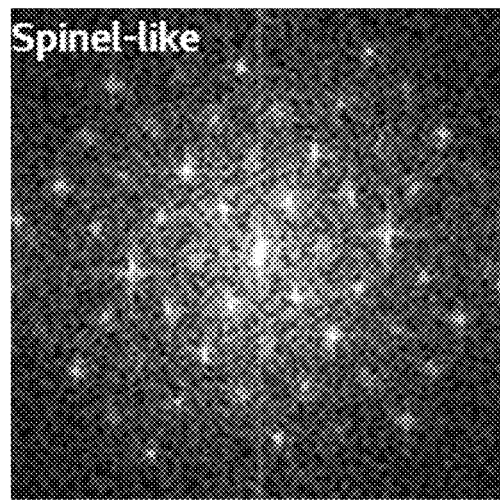
Figure 2D:
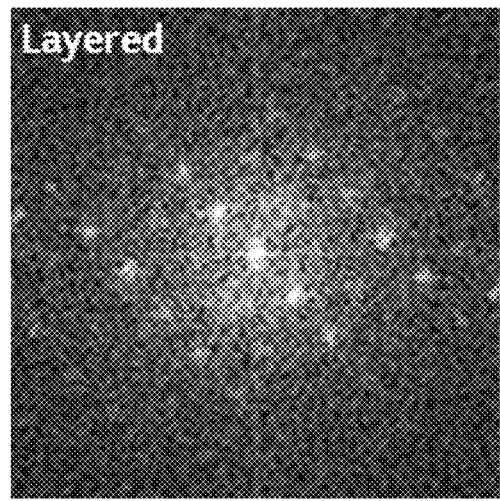
Figure 2E:
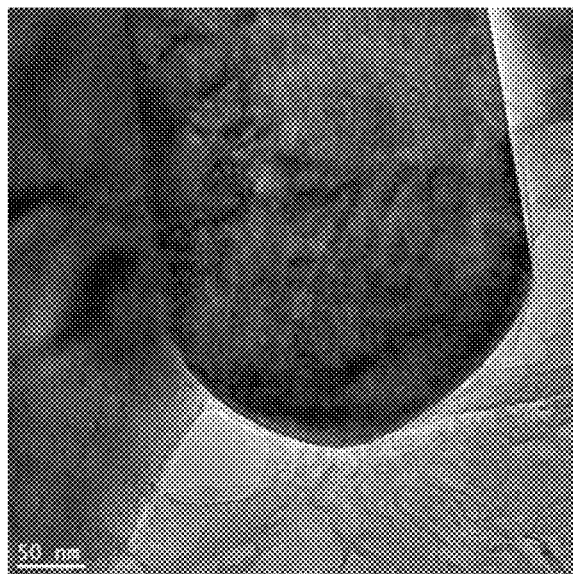
Figure 2F:
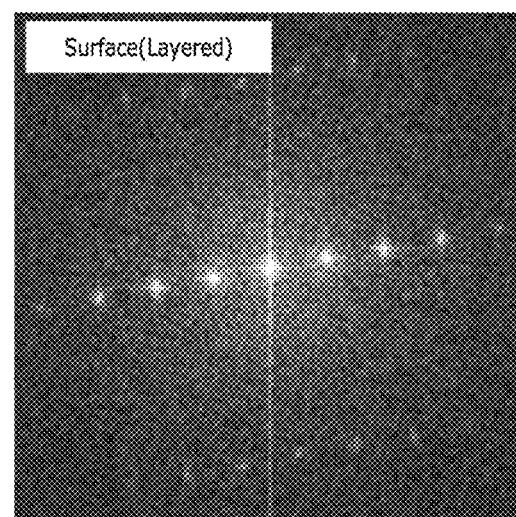
Figure 2G:
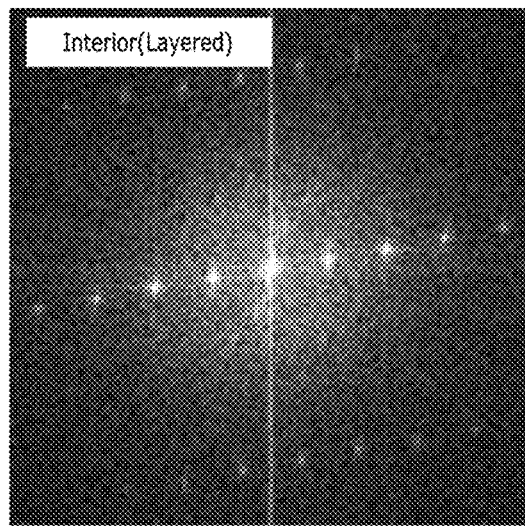

Example 2 and Comparative Example 1 were observed using TEM-ASTAR and HR-TEM equipment. Specifically, an HR-TEM image of Example 2 is shown in FIG. 2A, a TEM-ASTAR image of the surface thereof is shown in FIGS. 2B and 2C, and a TEM-ASTAR image of the central part thereof is shown in FIG. 2D. Further, an HR-TEM image of Comparative Example 1 is shown in FIG. 2E, a TEM-ASTAR image of the surface thereof is shown in FIG. 2F, and a TEM-ASTAR image of the central part thereof is shown in FIG. 2G.

Referring to FIGS. 2A to 2G, the crystal structure of the surface part may differ depending on the calcination temperature of the precursor, even though the compositions are the same. Specifically, Comparative Example 1 which was not over-calcined showed uniform formation of a layered crystal lattice structure from the surface thereof to the center thereof.

In contrast, Example 2 which was over-calcined showed different crystal structures in the surface thereof and the center thereof. More specifically, the over-calcined Example 2 had a single particle D50 of 6.8 μm, and had a rock salt structure, a spinel structure, or a mixed structure thereof from the surface part thereof to a depth of 25 nm, and the central part thereof is a layered structure.

Experimental Example 2 (Evaluation of Gas Generation)

The positive electrode active materials according to the examples and comparative examples were measured for gas generation and the results are shown in the following Tables 2 and 3, and FIGS. 2A and 2B.

Specifically, a method of measuring the gas generation is as follows.

Two NCM electrodes (loading amount per electrode area: 1000 mg/cm$^2$) charged at a 4.35 V voltage (based on a full cell) and two separators were placed on the bottom plate of a coin cell, and fixed with a gasket, and 80 μl of an electrolyte (DEC REF. (EC/PC/DEC=3/1/6, VC/PS=0.5/1 Wt %)) was injected under vacuum twice. Each surface was vacuum-sealed at a thickness of 0.5 cm using an aluminum pouch (Al pouch) of 6.5*10 cm. Here, the vacuum sealing means sealing under monocell vacuum sealing conditions of 95 kPa/93 kPa. Thereafter, each battery was stored in a convection oven at 60° C. for 2 weeks, and then gas generation in the battery was measured.

TABLE 2

| | Kind of gas | Example 1 | Example 2 | Example 3 | Example 4 | Example 5 | Example 6 |
|---|---|---|---|---|---|---|---|
| Gas generation (μL) | $H_2$ | 0 | 0 | 0 | 0 | 0 | 0 |
| | CO | 586.4 | 524.8 | 535.6 | 597.2222222 | 402.7 | 262.2504537 |
| | $CO_2$ | 899.7 | 891.3 | 871.1 | 805.5555556 | 639.2 | 412.8856624 |
| | $CH_4$ | 0 | 0 | 0 | 0 | 0 | 0 |
| | $C_2H_2$ | 0 | 0 | 0 | 0 | 0 | 0 |
| | $C_2H_4$ | 101.2 | 118.3 | 100.8 | 81.1965812 | 117.8 | 0 |

TABLE 2-continued

| Kind of gas | Example 1 | Example 2 | Example 3 | Example 4 | Example 5 | Example 6 |
|---|---|---|---|---|---|---|
| $C_2H_6$ | 0.0 | 0.0 | 0.0 | 0 | 0.0 | 0 |
| $C_3H_6$ | 49.8 | 50.8 | 46.8 | 25.64102564 | 40.7 | 26.31578947 |
| $C_3H_8$ | 0.0 | 0.0 | 0.0 | 0 | 0.0 | 0 |
| Σ (9 kinds of gases) | 1638.6 | 1582.7 | 1556.8 | 1509.6 | 1203.7 | 701.4519056 |

TABLE 3

| | Kind of gas | Example 7 | Example 8 | Example 9 | Example 10 | Example 11 | Example 12 |
|---|---|---|---|---|---|---|---|
| Gas generation (μL) | $H_2$ | 0 | 0 | 0 | 0 | 0 | 0 |
| | CO | 597.2222222 | 295.4545455 | 504.8638132 | 283.7620579 | 486.0486049 | 95.54140127 |
| | $CO_2$ | 805.5555556 | 795.4545455 | 885.2140078 | 1020.900322 | 612.9612961 | 286.6242038 |
| | $CH_4$ | 0 | 0 | 0 | 0 | 0 | 0 |
| | $C_2H_2$ | 0 | 0 | 0 | 0 | 0 | 0 |
| | $C_2H_4$ | 81.1965812 | 215.9090909 | 97.27626459 | 138.2636656 | 0 | 222.9299363 |
| | $C_2H_6$ | 0 | 0 | 0 | 0 | 0 | 0 |
| | $C_3H_6$ | 25.64102564 | 147.7272727 | 35.9922179 | 52.25080386 | 19.8019802 | 53.07855626 |
| | $C_3H_8$ | 0 | 0 | 0 | 0 | 0 | 0 |
| | Σ (9 kinds of gases) | 1506.410256 | 1454.545455 | 1527.237354 | 1495.2 | 1116.111611 | 658.1740977 |

Figure 3A:
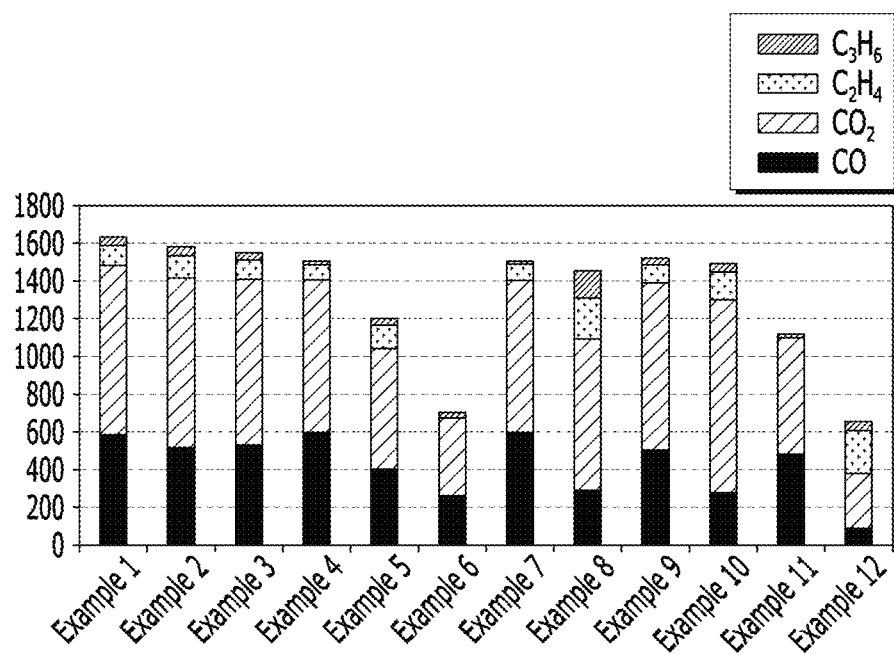
FIGS. 3A and 3B show gas generation of positive electrode active materials according to examples and comparative examples.
Figure 3B:
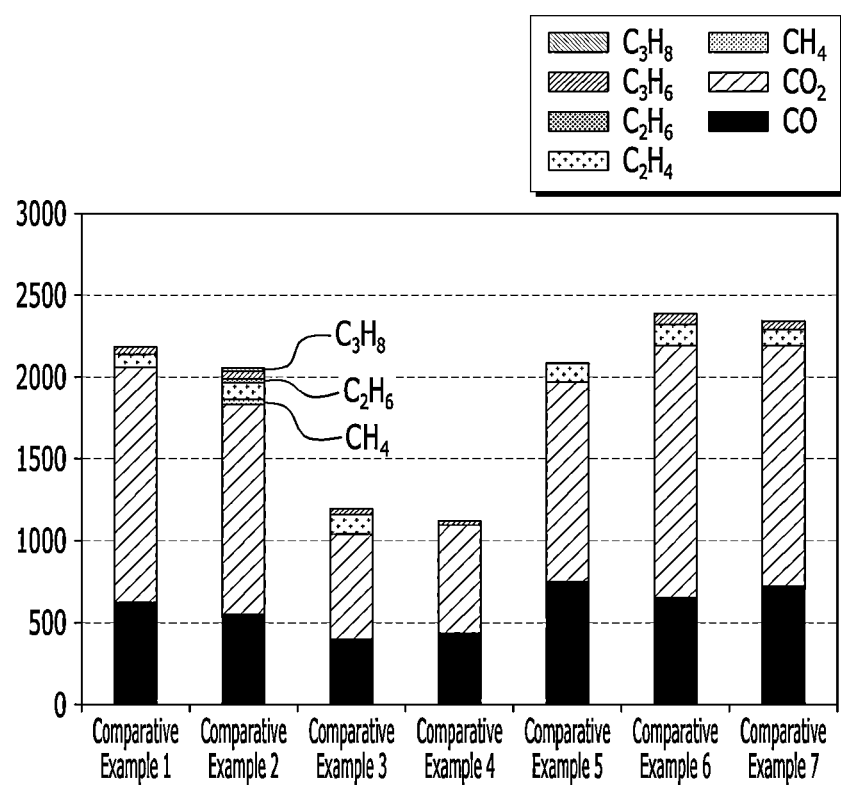

Referring to Tables 2 and 3 and FIGS. 3A and 3B, when over-calcination was performed at 960° C. or higher (Examples 1 to 12), gas generation was remarkably reduced.

Those over-calcined at 1010° C. (Examples 7 to 12) showed less gas generation than those over-calcined at 990° C. (Examples 1 to 6), which is attributed to the reduced amount of residual lithium and reduction of cracks inside the over-calcined particles and interface of the particle surface. Here, the cracks inside the particles and interface of the particle surface are regions where side reactions with the electrolyte may occur. Due to reduction of the regions where side reactions may occur, gas generation was remarkably reduced.

Experimental Example 3 (Evaluation of High-Temperature Operating Characteristics of Battery)

Each of the positive electrode active materials according to the examples and comparative examples was used to prepare a slurry for forming a positive electrode and a lithium secondary battery, and then their high-temperature lifetime characteristics were evaluated and the results are shown in the following FIGS. 4A and 4B.

Figure 4A:
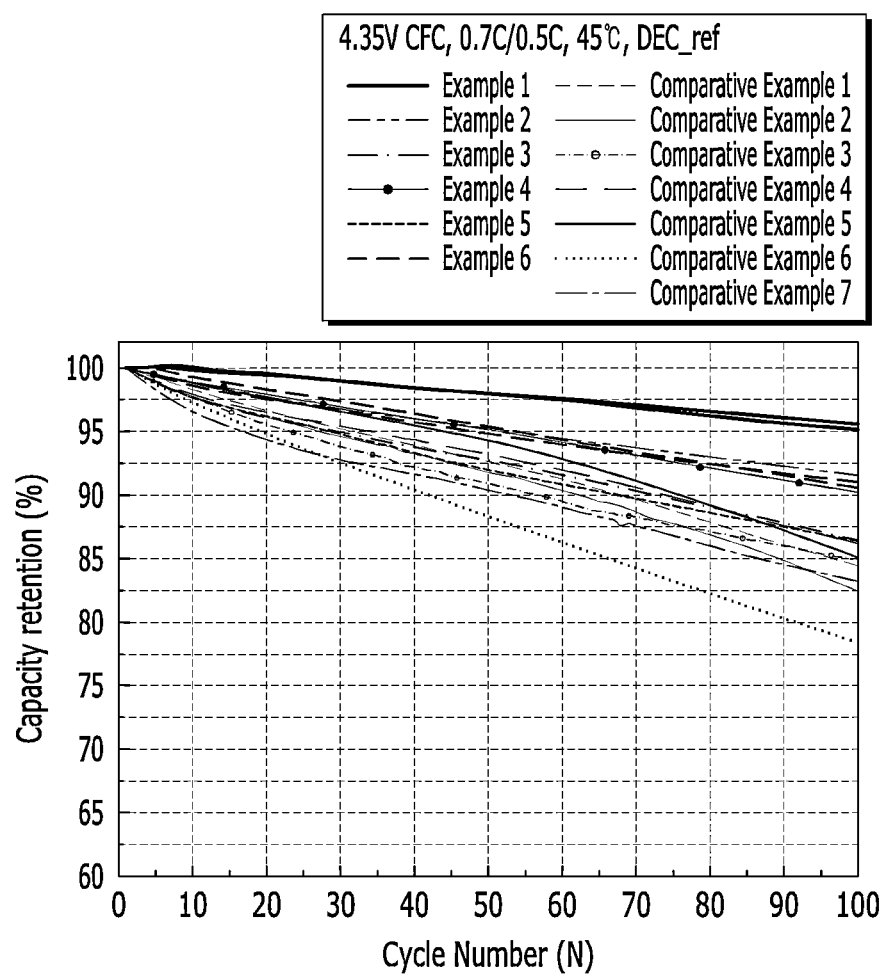
FIGS. 4A and 4B show graphs of comparing lifetime characteristics according to Experimental Example 2.
Figure 4B:
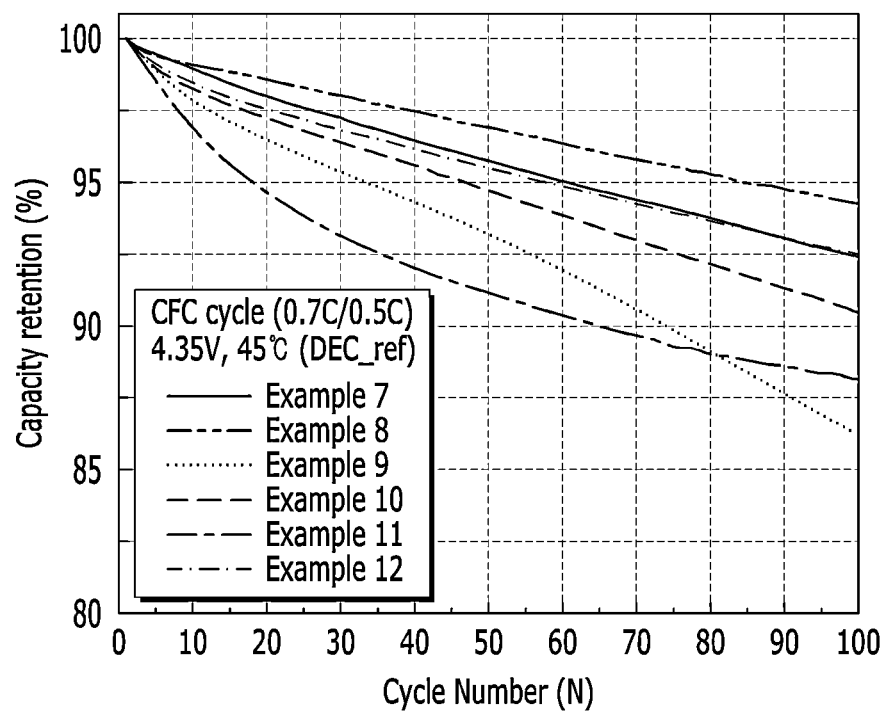

Referring to FIGS. 4A and 4B, the active materials of Examples 1 to 12 having all technical compositions of over-calcination of precursor particles and limited doping (and coating) contents showed excellent high-voltage and high-temperature lifetime characteristics. In contrast, Comparative Examples 1 and 2 not satisfying the over-calcination conditions showed capacity retention of 85% or less at 100 cycles, and the slopes gradually increased. Thus, it is expected that the capacity retention will more rapidly decrease after 100 cycles. Comparative Examples 3 and 4 of which coating and doping contents were out of the conditions showed that capacity retention decreased and the slopes gradually decreased with cycling. Thus, it is expected that the capacity retention will further decrease after 100 cycles. Comparative Example 5 in which coating and doping were not performed showed excellent initial capacity retention, but showed a rapid decrease after 70 cycles. Comparative Example 6 in which over-calcination did not occur and the size of the precursor was large showed a rapid decrease in initial capacity retention. Comparative Example 7 in which over-calcination occurred but the precursor size and the coating/doping contents did not satisfy the conditions of the present invention showed a rapid decrease in initial capacity retention and deterioration in lifetime characteristics with cycling.

In particular, those over-calcined at 1010° C. (Examples 7 to 12) showed excellent capacity retention of the battery compared to those over-calcined at 990° C. (Examples 1 to 6), which may be associated with gas generation, as confirmed in Experimental Example 2. Specifically, those over-calcined at 1010° C. (Examples 7 to 12) showing low Co release may improve electrochemical properties of the battery, as compared with those over-calcined at 990° C. (Examples 1 to 6).

However, all of those over-calcined at 990° C. (Examples 1 to 6) and those over-calcined at 1010° C. (Examples 7 to 12) showed remarkable improvement in the capacity retention, as compared with those of the comparative examples.

While preferred exemplary embodiments of the present invention have been described in detail, the scope of the present invention is not limited to the foregoing embodiment, and it will be appreciated by those skilled in the art that various modifications and improvements using the basic concept of the present invention defined in the appended claims are also included in the scope of the present invention.

The invention claimed is:

1. A positive electrode active material for a lithium secondary battery, the positive electrode active material comprising a nickel-based lithium composite metal oxide single particle, wherein the single particle includes a plurality of crystal grains, and a metal doped in a crystal lattice of the single particle, wherein the metal is one or more metals selected from the group consisting of Al, Ti, Mg, Zr, W, Y, Sr, Co, F, Si, Na, Cu, Fe, Ca, S, and B, wherein the single particle has an average particle size (D50) of from 3.5 μm to 8 μm.

2. A positive electrode active material for a lithium secondary battery, the positive electrode active material comprising: a nickel-based lithium composite metal oxide single particle, wherein the single particle includes a plurality of crystal grains, and a metal doped in a crystal lattice of the single particle, wherein the metal doped in a crystal lattice of the single particle is one or more metals selected from the group consisting of Al, Ti, Mg, Zr, W, Y, Sr, Co, F, Si, Na, Cu, Fe, Ca, S, and B; and a metal compound coated on a surface of the single particle, wherein the metal compound is one or more metals selected from the group consisting of Al, Ti, Mg, Zr, W, Y, Sr, Co, F, Si, Na, Cu, Fe, Ca, S, and B, wherein the single particle has an average particle size (D50) of from 3.5 μm to 8 μm.

3. The positive electrode active material for a lithium secondary battery of claim 1, wherein the single particle includes, in the crystal lattice, a surface part having a rock salt structure, a spinel structure, or a mixed structure thereof from a surface of the single particle to a depth of 0.13% to 5.26% of a radius of the lithium composite metal oxide single particle, and a central part having a layered structure from an interface with the surface part thereof to the center part of the single particle.

4. The positive electrode active material for a lithium secondary battery of claim 1, wherein the nickel-based lithium composite metal oxide is represented by Chemical Formula 1:

$$Li_a(Ni_xMn_yCo_z)O_{2+b} \quad (1)$$

wherein, $0.95 \leq a \leq 1.2$, $0 \leq b \leq 0.02$, $0 < x < 0.6$, $0 \leq y \leq 0.4$, $0 \leq z < 0$, and $x+y+z=1$.

5. The positive electrode active material for a lithium secondary battery of claim 4, wherein in Chemical Formula 1, $a=1$, $0 \leq b \leq 0.02$, $0.4 \leq x < 0.6$, $0.1 \leq y < 0.4$, $0.1 \leq z < 0.4$, and $x+y+z=1$.

6. The positive electrode active material for a lithium secondary battery of claim 4, wherein Chemical Formula 1 is $LiNi_{0.5}Co_{0.2}Mn_{0.3}O_2$ or $LiNi_{0.5}Co_{0.3}Mn_{0.2}O_2$.

7. The positive electrode active material for a lithium secondary battery of claim 1, wherein the metal is Ti, Mg, or Zr.

8. The positive electrode active material for a lithium secondary battery of claim 1, wherein the metal is Zr.

9. The positive electrode active material for a lithium secondary battery of claim 2, wherein a total content of the metal doped in the crystal lattice of the single particle and the metal in the metal compound coated on the surface thereof is 2500 ppm to 6000 ppm.

10. A lithium secondary battery comprising the positive electrode active material of claim 1, wherein the lithium secondary battery has a high-temperature retention rate (%) of more than 85% at 100 cycles, wherein the high-temperature retention rate is measured by charging the lithium secondary battery at 45° C. at constant current/constant voltage (CC/CV) of 0.7 C to 4.35 V/38 mA, and then discharging at constant current (CC) of 0.5 C to 2.5 V, and then measuring a discharge capacity for 1 cycle to 100 cycles.

* * * * *